US012689014B2

(12) United States Patent
Van Berkel

(10) Patent No.: US 12,689,014 B2
(45) Date of Patent: Jul. 21, 2026

(54) SAMPLING SYSTEM FOR AN OPEN PORT PROBE

(71) Applicant: DH Technologies Development Pte. Ltd., Singapore (SG)

(72) Inventor: Gary J. Van Berkel, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 486 days.

(21) Appl. No.: 18/254,617

(22) PCT Filed: Nov. 30, 2021

(86) PCT No.: PCT/IB2021/061135
§ 371 (c)(1),
(2) Date: May 26, 2023

(87) PCT Pub. No.: WO2022/113053
PCT Pub. Date: Jun. 2, 2022

(65) Prior Publication Data

US 2024/0021425 A1 Jan. 18, 2024

Related U.S. Application Data

(60) Provisional application No. 63/119,281, filed on Nov. 30, 2020.

(51) Int. Cl.
*H01J 49/04* (2006.01)

(52) U.S. Cl.
CPC ...... *H01J 49/0431* (2013.01); *H01J 49/0459* (2013.01)

(58) Field of Classification Search
CPC .... H01J 49/04; H01J 49/0459; H01J 49/0404; H01J 49/0431
See application file for complete search history.

(56) References Cited

U.S. PATENT DOCUMENTS

| | | | | |
|---|---|---|---|---|
| 10,578,593 | B2 * | 3/2020 | Van Berkel | G01N 1/20 |
| 2007/0137320 | A1 * | 6/2007 | Bremer | G01N 30/18 73/864.01 |
| 2017/0316926 | A1 | 11/2017 | Arnold | |

(Continued)

FOREIGN PATENT DOCUMENTS

| | | | | |
|---|---|---|---|---|
| WO | WO-0157490 A1 * | 8/2001 | | B01L 3/0279 |
| WO | 2016164766 A1 | 10/2016 | | |

(Continued)

OTHER PUBLICATIONS

Sosnowski and Hopfgartner, "Application of 3D Printed Tools for Customized Open Port Probe-Electrospray Mass Spectrometry", Talanta 215 (2020), published Mar. 20, 2020 (Year: 2020).*

(Continued)

*Primary Examiner* — David E Smith
(74) *Attorney, Agent, or Firm* — Lathrop GPM LLP; Malaika O.D. Tyson; Jason Kuchar

(57) ABSTRACT

The disclosure provides systems and methods for introducing a sample into an open port interface of an analytical device. More particularly, the disclosure relates to a sampling system that includes a dispenser, a hollow tip that releasably couples to the dispenser, and a gantry for receiving the tip. The gantry can be mounted to the open port interface of an analytical device.

16 Claims, 4 Drawing Sheets

(56) References Cited

U.S. PATENT DOCUMENTS

| | | | | |
|---|---|---|---|---|
| 2020/0234940 | A1* | 7/2020 | Fukui | H01J 49/165 |
| 2021/0031205 | A1* | 2/2021 | Shikata | B01L 3/50825 |

FOREIGN PATENT DOCUMENTS

| | | | | |
|---|---|---|---|---|
| WO | WO-2017193213 | A1 * | 11/2017 | H01J 49/0459 |
| WO | 2018069872 | A1 | 4/2018 | |
| WO | 2020016809 | A1 | 1/2020 | |

OTHER PUBLICATIONS

International Search and Written Opinion for PCT Patent Application No. PCT/IB2021/061135 mailed Apr. 8, 2022.
Sosnowski Piotr et al., "Application of 3D Printed Tools for Customized Open Port Probe-Electrospray Mass Spectrometry", Talanta, vol. 215, Aug. 1, 2020, p. 120894.

* cited by examiner

SAMPLING SYSTEM FOR AN OPEN PORT PROBE

RELATED APPLICATIONS

The present application is filed pursuant to 35 U.S.C. 371 as a U.S. National Phase application of International Patent Application No. PCT/IB2021/061135, which was filed Nov. 30, 2021. This application claims the benefit of priority from U.S. Provisional Application No. 63/119,281, filed on Nov. 30, 2020, the entire contents of which is the aforementioned application are hereby incorporated by reference herein.

FIELD

This application relates to methods and systems of sampling into an open port probe.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

One challenge of MS analysis arises from sample collection and introduction from complex sample matrices (e.g. biological, environmental, chemical, and food samples) that is fast, reliable, and reproducible. A recent advancement in sample introduction is an open port sample interface in which relatively unprocessed samples can be introduced into a continuous flowing solvent that is delivered to an ion source of an MS system. This is described for example in an article entitled "An open port sampling interface for liquid introduction atmospheric pressure ionization mass spectrometry" of Van Berkel et al., published in *Rapid Communications in Mass Spectrometry,* 29(19), pp. 17 49-1756 (2015), which is incorporated by reference in its entirety.

An open port sampling interface (OPI) presents a capture region in the form of a liquid-air interface that can allow a rapid sample introduction for mass analysis. However, in certain configurations the small open end of the sampling interface can make the reproducible loading of samples within the OPI probe challenging. While automation may be used for processing a large number of samples, for routine lower volume sample processing, there is a need for improved introduction of a sample to the liquid-air interface of an OPI. There remains a need for improved sample introduction techniques that provide sensitivity, simplicity, selectivity, speed, reproducibility, and high-throughput.

Described herein is a novel sampling system to facilitate alignment with an OPI of a mass spectrometer or other analytical device to deliver a sample to the capture fluid within the OPI.

SUMMARY OF THE DISCLOSURE

In some embodiments, a sampling system is provided. The sampling system including a gantry adapted to interface with an open port interface (OPI). The gantry including a receiver for receiving an item to be sampled. In some embodiments, the item to be sampled comprises a dispenser supporting a sample for introduction into the OPI.

The disclosure generally provides a system and method for introducing a sample into an analytical device. In one aspect, a sampling system can include (a) a dispenser comprising a central channel extending through at least a portion of the dispenser, and a distal end, wherein the central channel terminates in an opening in the distal end of the dispenser; (b) a hollow tip comprising a first opening that releasably couples with the distal end of the dispenser and a second opening at an opposite end of the hollow tip; and (c) a gantry for receiving the hollow tip. The distal end of the dispenser and the hollow tip can be tapered and coupled such that the outer surface of the distal end of the dispenser is essentially flush with the inner surface of the hollow tip. The gantry may further position and locate the tip in alignment with a capture region of an open port interface so as to facilitate introduction of sample held by the dispenser into the capture region.

In one aspect, the hollow tip is disposable or intended for single-use. In example embodiments the hollow tip can be made of non-reactive materials such as, for example, PEEK, glass, stainless steel, fused silica, ceramics, etc.

In another aspect, the dispenser further comprises an ejection mechanism for removal of the hollow tip.

The gantry of the sampling system comprises (i) a receiver for accepting the hollow tip; (ii) a hollow mounting end oppositely disposed from the receiver; and (iii) a compressible portion disposed between the receiver and the hollow mounting end. The compressible portion of the gantry in some example embodiments can include a central channel extending therethrough and a spring mechanism.

When the sampling system is assembled, the channels and openings of the dispenser, hollow tip, and gantry are centrally aligned, and can be in fluid communication.

In another aspect, the hollow mounting end of the gantry releasably couples to an open port interface of an analytical device. When the gantry is mounted on an analytical device, the assembled sampling system aligns the hollow tip with the open port interface of the device. In some aspects, the analytical device is a mass spectrometer.

In a further aspect, the disclosure provides a method for introducing a sample into an open port interface using the sampling system described herein. The method can comprise (a) obtaining a sample with the hollow tip of the dispenser-tip assembly; (b) mounting the hollow mounting end of the gantry on an open port interface of an analytical device; (c) inserting the hollow tip into the receiver of the gantry; (d) compressing the compressible portion of the gantry such that the hollow tip approaches the open port interface; and (e) introducing the sample into a solvent or capture fluid traveling through the open port interface.

In some aspects, the method comprises introducing a sample into the open port interface of a mass spectrometer. In example embodiments, the sample can be a liquid or solid material.

In some aspects, the sample is injected into a solvent or capture fluid traveling through the open port interface. In some aspects and example embodiments, the tip of the sampling system contacts the solvent or capture fluid to introduce the sample into the open port interface.

In some embodiments, a gantry is provided for receiving a dispenser that contains sample. The gantry may be positioned to align the dispenser with a capture region of an open port interface for immersion of the sample in capture fluid flowing through the capture region. In some aspects, the gantry is operative to receive the dispenser in a first position wherein the sample is positioned outside of the capture region, and to advance the dispenser to a second position wherein the sample is positioned within the capture region. In such embodiments, the gantry is operative and can be adjusted to align the dispenser and sample with the capture region of the open port interface and control a depth of advance of the sample into the capture region of the open port interface.

In some embodiments, the hollow tip may comprise a portion of the dispenser for engagement with the receiver. In some embodiments, the hollow tip may comprise a separate item from the dispenser for disposition between the dispenser and the receiver.

DETAILED DESCRIPTION

Described herein is a sampling system comprising a sample dispenser and gantry for alignment and delivery of a sample to an open port interface. The open port interface provides a capture region that provides or exposes a flowing capture fluid upon sample delivery. Sample may be introduced into the capture region and be captured in the capture fluid. The capture fluid may transport the sample to any analytical device including, for example, a conventional electrospray ion source to ionize the sample. In some aspects, the capture fluid may comprise a solvent to further dilute the sample and deliver a sample-solvent solution/dilution to the electrospray ion source.

Embodiments of the sample dispenser and gantry are operative to interact in order to align sample held by the dispenser with the capture region and/or to control a depth of advance of the sample into the capture region. In some aspects, the dispenser and gantry may further comprise a disposable tip that may physically separate the dispenser from the gantry. In some aspects, advance of the sample may be controlled to provide for a set period of immersion of the sampling system in the capture region.

Figure 1:
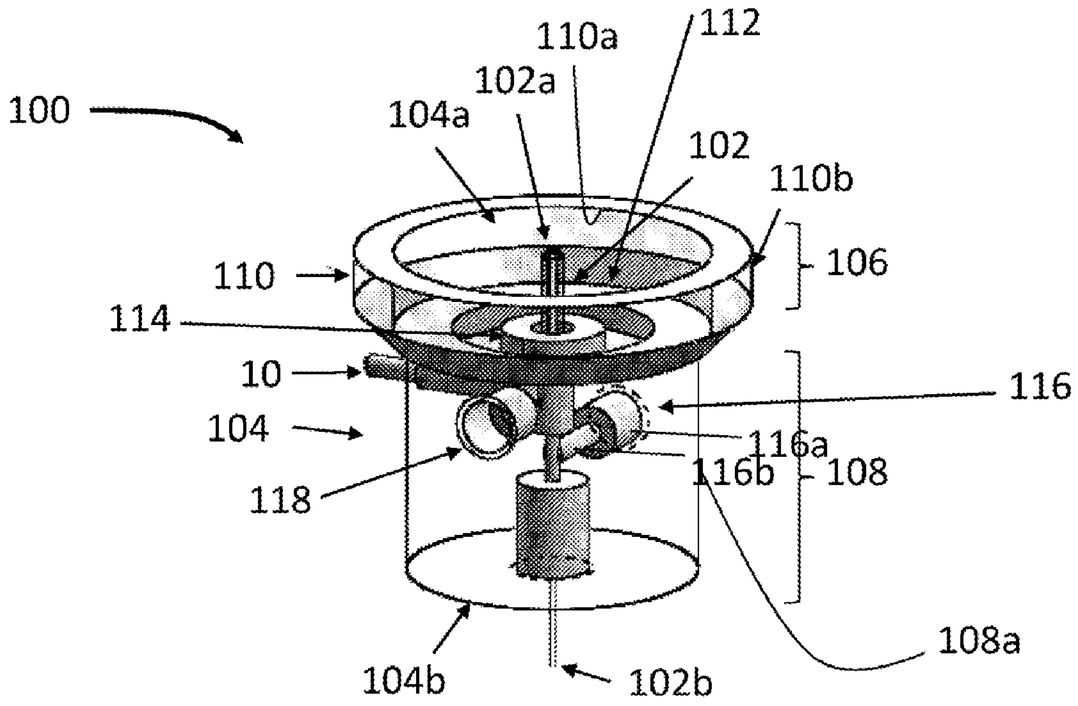
FIG. 1 illustrates a perspective view of a sample delivery device having an open port interface for delivering a sample according to some aspects and example embodiments of the present disclosure.

FIG. 1 illustrates, in accordance with an example embodiment of the disclosure a sampling system device 100 for delivering a sample to an analytical device such as a mass spectrometer. The device 100 includes an open port interface (OPI) 102 that is disposed/inserted in a chamber 104 (herein also referred to as a fluidic chamber, which operates as a probe alignment apparatus), which extends from a top opening 104*a* to a bottom opening 104*b*. In this embodiment, the chamber 104 includes an upper portion 106 and a lower portion 108. The upper and the lower portions are substantially cylindrical, though other shapes can also be employed. The upper portion 106 of the chamber 104 includes a sidewall 110 having an inner surface 110*a* and an outer surface 110*b*.

The lower portion 108 of the chamber 104 has a cylindrical sidewall 108*a*. A tapered transition segment 112 joins the upper portion 106 of the chamber 104 to its lower portion 108. In this embodiment, the upper portion, the tapered transition segment and the lower portion of the chamber 104 are formed as one integral unit, though in other embodiments they can be made separately and joined to one another.

In this example embodiment, the OPI 102 includes of a pair of co-axial tubes, though other configurations are contemplated and described by the inventors in other publications. The outer tube of the co-axial pair receives capture fluid from a capture fluid source and supplies the capture fluid to an open end 102*a* of the inner tube of the co-axial pair, which is configured to receive a sample. The capture fluid, and any captured sample, may be aspirated from the open end 102*a* and travel through the inner co-axial tube to an outlet port 102*b* for deliver to an analytical device, such as an electrospray ion source of a mass spectrometer.

The open end 102*a* of the OPI 102 generally defines a capture region for receiving and capturing sample. In some example embodiments that may be applicable to a variety of applications, sample is introduced into a region of the open end 102*a* defined by the inner co-axial tube for direct transport to the outlet pot 102*b*.

In the example embodiment depicted in FIG. 1, the OPI 102 is positioned within the chamber 104 such that a top portion thereof is within the upper portion 106 and the lower portion thereof is within the lower portion 108 of the chamber 104. More specifically, in this embodiment, the OPI 102 passes through an opening 112*a* generally defined by a region of a transition segment, or partition, 112 disposed between the upper portions 106 and 108 of the chamber 104 to extend between these two portions of the chamber. A disk-shaped element 114, which may be supported by a portion of the partition 112, surrounds a portion of the OPI 102 to facilitate maintaining the OPI 102 in a stable orientation within the chamber 104.

In this embodiment, the OPI 102 is positioned substantially vertically within the chamber 104 such that its open end 102*a* is at, or in close proximity of, the top opening 104*a* of the chamber 104. In other embodiments, the open end 102*a* of the probe can protrude above the upper portion 106 of the chamber 104. While illustrated as an upright OPI 102, the orientation may vary and under aspiration the OPI 102 may operate in an inverted position, sideways position, or other configurations.

The device 100 further includes a capture fluid inlet port 116 that includes a connector 116*a* that protrudes through the sidewall 108*a* of the lower portion of the chamber outside the chamber for coupling to a capture fluid source and a pipe 116*b* that extends from the connector 116*a* to the OPI 102. The inlet port 102*a* can provide a flow of a capture fluid, such as a solvent, through the OPI 102, past the open end 102*a* and to be aspirated from the open end 102*a* to flow to the outlet port 102*b*. The capture fluid may comprise a liquid, gas, or a combination of liquid and gas.

In this illustrated example embodiment, the device 100 further includes a capture fluid overflow outlet 118 that is coupled to the chamber and protrudes through the sidewall 108*a* of the lower portion of the chamber through which capture fluid overflow can be removed from the OPI 102.

The OPI 102 can have a variety of configurations but generally includes an open end, such as the open end 102*a*, that defines a capture region and presents a liquid-air interface by which a sample liquid is delivered to the capture fluid for capture and transport to an analytical device.

The device 100 can further include a ground wire 10 for electrically grounding the OPI.

Figure 2A:
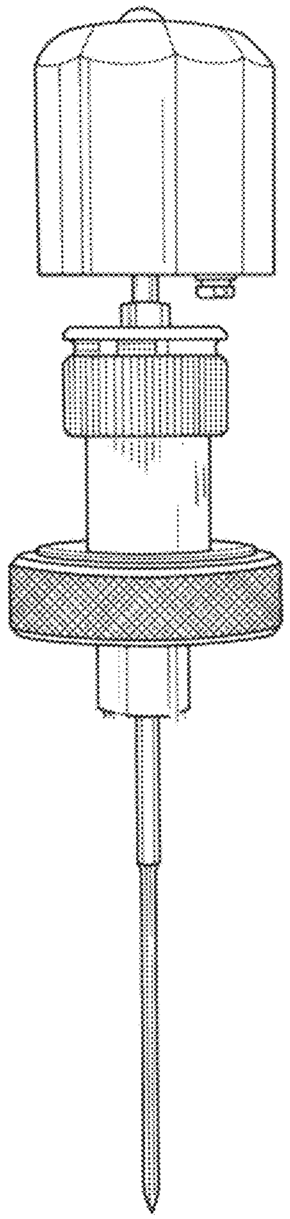
FIG. 2A is a first photograph an open port interface according to some aspects and example embodiments of the present disclosure.
Figure 2B:
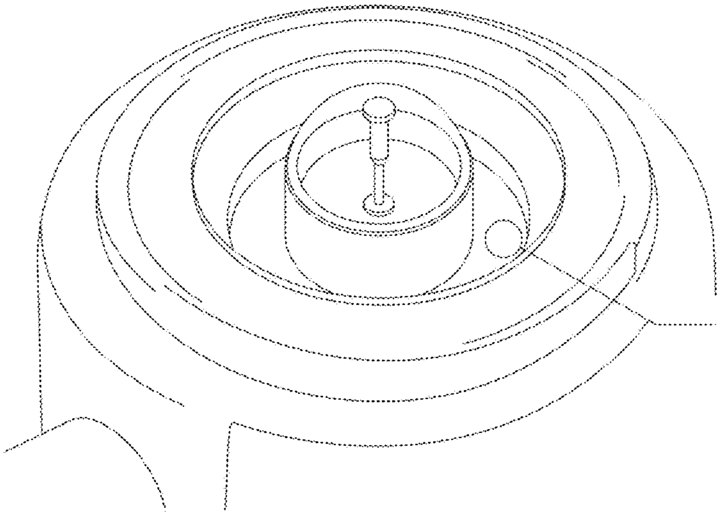
FIG. 2B is a second photograph of the open port interface as depicted in FIG. 2A.

FIGS. 2A and 2B are photographs of another example embodiment of an OPI within the scope of the disclosure. Generally, FIG. 2A depicts a side view of the example OPI, with a capture region at the top of the photo extending slightly beyond a surrounding chamber structure, while FIG. 2B depicts a top-down, side view of the example OPI with a closer view of the capture region located at the center, within a surrounding chamber, of the OPI.

In one aspect, the disclosure relates to a sampling system that includes a sampler/sampling probe in the form of a sample dispenser and a gantry/adaptor for an OPI. The gantry operates to cooperatively engage with the dispenser to locate sample held by the dispenser proximate to, and in alignment with, the open end (e.g., capture region 102*a*) of the OPI. The gantry may be further operative to limit a distance of sample introduction into the open end (e.g., capture region 102*a*) to control a depth of immersion of the sample within the capture fluid present in the capture region 102*a* of the OPI.

In some embodiments, a sampling system is provided. The sampling system including a gantry adapted to interface with an open port interface (OPI). The gantry including a receiver for receiving an item to be sampled. The item to be sampled may be, for instance, a dispenser supporting a sample for introduction into the OPI.

When the gantry interfaces with the OPI, the receiver is positioned in alignment with the open end of the OPI such that the dispenser is guided into the capture region of the OPI. In some aspects, the gantry may include a depth limiter such that the dispenser may be guided to a pre-determined depth within the capture region and be limited from protruding further into the capture region.

Figure 3:
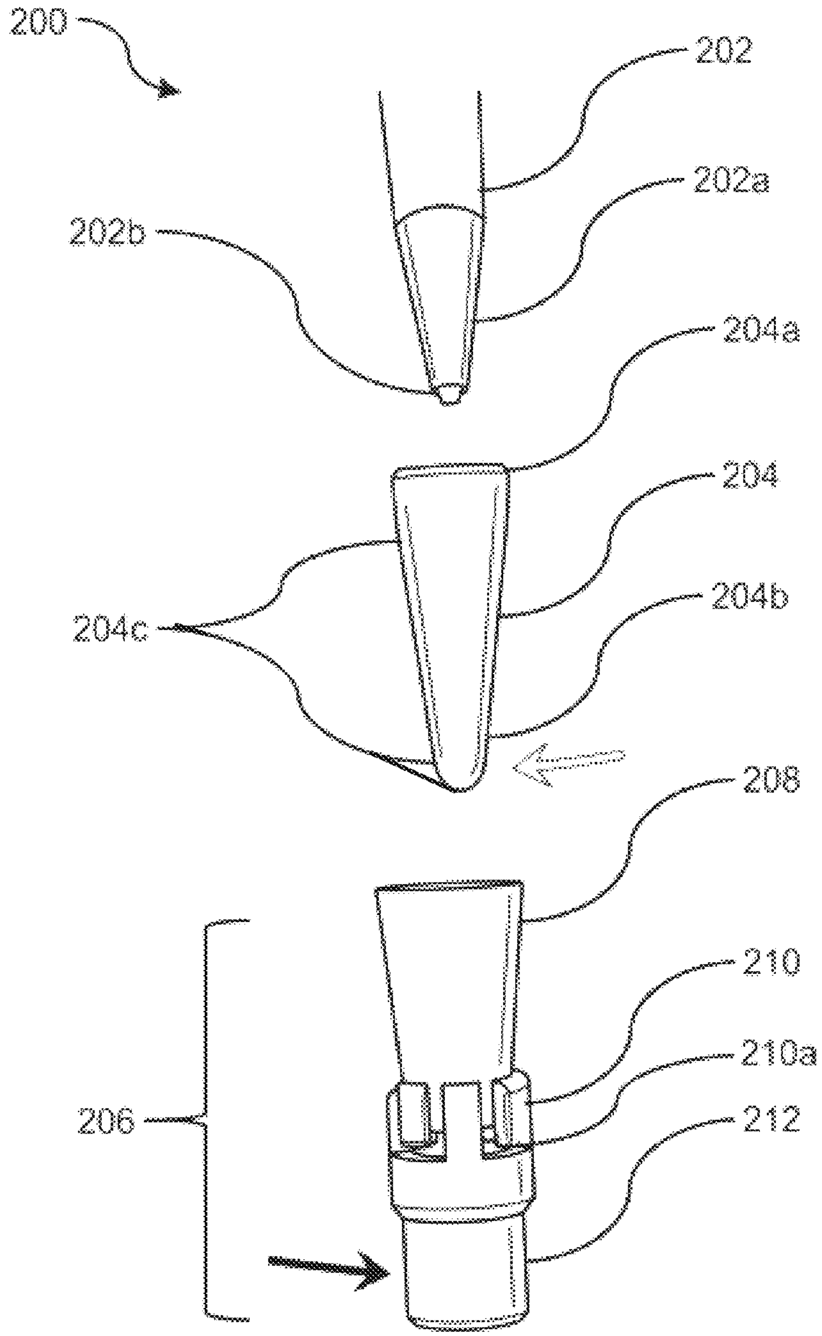
FIG. 3 is a photograph of a sampling system according to some aspects of the present disclosure.

Turning to FIG. 3, depicting in accordance with some embodiments of the disclosure a sampling system 200 that includes a dispenser 202, a hollow tip 204, and a gantry 206. The dispenser 202 includes a tapered end 202*a* that, in some embodiments, couples or mates with the hollow tip 204 via an opening 204*a*. The tapered end 204*b* of the hollow tip 204 includes an opening 204*c* for handling and dispensing a sample. The hollow tip 204 is designed for releasable coupling with dispenser 202.

While the dispenser 202 and the hollow tip 204 are shown in this illustrative example embodiment with tapered ends, it will be understood that varied geometries are possible as long as the dispenser and tip can be coupled. In some aspects, hollow tip 204 is disposable and/or intended for single-use to prevent cross-over and/or contamination between sampling events. In some aspects, hollow tip 204 may comprise a portion of the dispenser 202 rather than a separate component. In these aspects, the entire dispenser 202 may comprise a disposable item, or may be cleanable between insertions where sample cross-over or contamination presents a concern.

Depending upon the nature of the sample and the capture fluid present in the capture region of the OPI, the hollow tip 204 can be made from a material that minimizes chemical leeching in the presence of the capture fluid as is known in the art (i.e., non-reactive materials). For example, materials such as glass, quartz, fused silica, polyether ether ketone (PEEK) and other suitable plastics, stainless steel and other non-reactive metals, ceramics, etc., are common materials used in mass spectrometry that are compatible with typical solvents for sample delivery to an ion source.

In some embodiments, the hollow tip 204 may incorporate a sample extraction member or probe, for instance a solid phase microextraction (SPME) fiber, to facilitate capture of a sample and introduction of the captured sample on the extraction member into the OPI 102.

In embodiments, the dispenser 202 includes a central channel extending through at least a portion of the dispenser that terminates in an opening 202*b*, and includes an ejection mechanism for tip disposal. The dispenser 202 can, for example, operate via piston-driven air displacement for sample uptake and release.

In embodiments, the gantry 206 functions as an adapter between the hollow tip 204 and the open end of an OPI. The gantry 206 includes a receiver 208 for receiving an item to be sampled such as the hollow tip 204, a compressible portion 210, and a hollow mounting end 212 that attaches to the open end of the OPI. In some embodiments, the gantry 206 is cylindrical and may conveniently be crafted out of a tube, though other geometries may be suitable as well.

In embodiments, sampling system 200 allows for manual or automated sampling of biological, environmental, or chemical analytes. Samples can be liquid or solid materials from various surfaces or sources including solutions, dust, particulate, ink, skin, fingerprint residue, bodily fluid, currency, etc.

During operation, the gantry 206 may be mounted or threaded to the opening of the OPI. For example, in some embodiments, such as those illustrated in FIG. 1, the OPI may comprise outer surface 110*b* that provides a mounting surface for releasably coupling the gantry 206 to receive the dispenser 202 fitted with the hollow tip 204. In some embodiments, such as those illustrated in FIG. 2B, the outer wall of the mounting end 212 of the gantry 206 is coupled to the inner wall of the capture fluid spillover catch basin of the OPI (generally indicated by black line and circle in FIG. 2B).

In another aspect, the present disclosure relates to a method of introducing a sample into an analytical device using the sampling system described herein. In some embodiments, the sampling system provides for a controlled depth of introduction of the sample into a capture region of the OPI which may include penetration into a capture fluid 222 passing through the OPI and exposed in the capture region.

Figure 4:
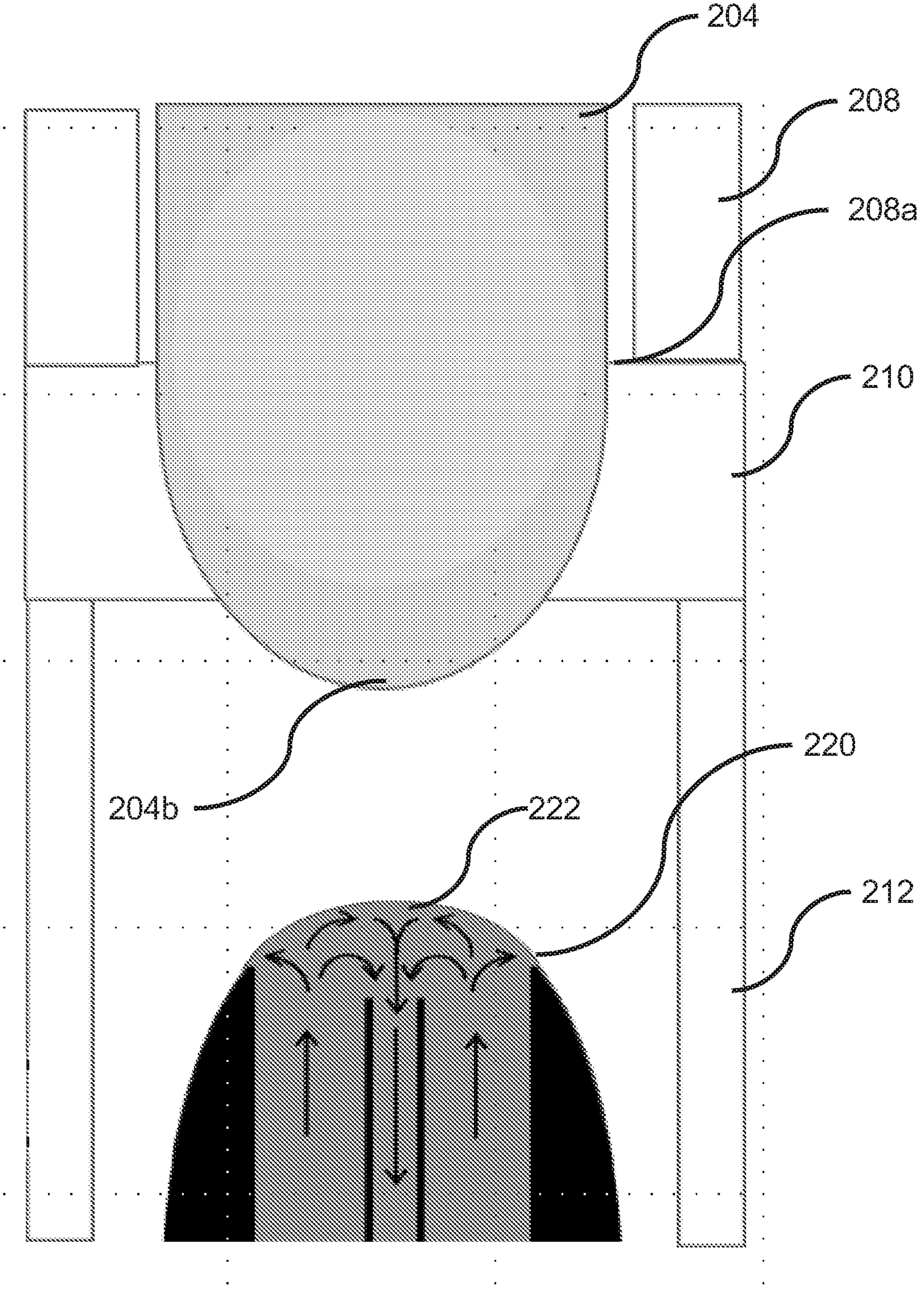
FIG. 4 illustrates a sampling system positioned to introduce a sample into an open port interface.

FIG. 4 illustrates an example embodiment of sampling system 200 mounted to an OPI. The mounting end 212 of the gantry 206 is mounted over OPI 220. The tip 204 is mated with the dispenser 202 (not shown) and a sample taken up. The receiving end 208 of the gantry is hollow with an open terminal end 208*a* through which the tip 204 passes to contact the compressible portion 210 of the gantry. The compressible portion 210 may include any deformable or compressible material or structure, such as, for example, a spring mechanism 210*a* (shown in FIG. 3) and a central channel extending therethrough. When disposed over the OPI 220, the sampling system 200 aligns the tip 204 (e.g., hollow tip) with the capture region, i.e. essentially directly over the solvent or capture fluid 222 running through the OPI, to direct introduction of the tip 204 into the capture region. The compressible portion 210 of the gantry brings the tip 204 in close proximity to the OPI 220, and the sample is introduced, for example, manually by a user or automatically by software executing instructions, into the solvent or capture fluid of the OPI. After sample release, the spring mechanism 210*a* (FIG. 3) returns to its resting position and the dispenser 202 and tip 204 are removed from the gantry 206. The used tip can be ejected from the dispenser 202 and a new tip inserted for injection of another sample. In some embodiments, the loading and release cycle of the spring mechanism 210*a* is timed or automated as to reduce user variability.

In some embodiments, a latched spring arrangement, similar to a ball-point pen, may be employed. In these embodiments, the gantry may be advanced to locate the tip 204 within the capture fluid 222 exposed in the capture region of the OPI 220. For manual insertion, a user may push down to complete a 'spring loading/release' wherein the sampler is placed in the gantry and a user actuated push-button acts to advance the tip 204 into the capture region and to release the tip 204 from the capture region.

In some embodiments, actuation may be performed by an actuator, such as a solenoid, motor or other form of actuator to advance or retract the tip 204 containing sample. In some aspects, the actuator may be controlled to provide a set time period for advancing and/or retracting the tip 204. In some aspects the set time period may be used to control an immersion time for the tip 204 in the capture fluid 222 when advanced into the capture region. Use of a controlled actuator conveniently eliminates variation in sample immersion between sample introduction, along with other user variables.

In some embodiments, the tip 204 is lowered in close enough proximity to OPI 220 such that the sample is injected into the solvent or capture fluid. In embodiments, the tip 204 can make fluid contact or not make fluid contact with the solvent or capture fluid. This sample introduction method is particularly useful for liquid sample materials. In some embodiments, the tip 204 is lower to OPI 220 such that the tip contacts the capture fluid. This sample introduction method is particularly useful for solid or non-flowing sample materials.

In contrast to unassisted manual injection or introduction of a sample into OPI 220, sampling system 200 allows for consistent alignment of the OPI with a sample source (i.e. dispenser 202 and tip 204). This improves loading accuracy, reduces sample injection variation, and promotes more reproducible downstream analysis.

The materials used for the dispenser 202 and tip 204 can, in some embodiments, include hydrophilic surfaces to aliquot accurate volumes of liquid samples, hydrophobic materials to adsorb compounds from liquid samples for purposes of sample purifications, or materials with specific affinities for targeted analytes such as, for example, antibodies or aptamers.

The dispenser, tip, and gantry may be sized to facilitate interaction between an OPI 220 and the sample to be introduced. In general, capture fluid flows through an OPI 220 in the range of nano liters or micro liters per minute for conventional electrospray ion sources. The sample size and, and accordingly the dispenser, tip, and gentry, may be selected to match a desired amount of sample introduction into the capture fluid.

The presently described technology is now described in such full, clear, concise, and exact terms as to enable any person skilled in the art to which it pertains, to practice the same. It is to be understood that the foregoing describes preferred aspects of the technology and that modifications may be made therein without departing from the spirit or scope of the invention as set forth in the appended claims.

The invention claimed is:

1. A sampling system comprising:

a) a dispenser comprising a distal end and a central channel extending through at least a portion of the dispenser, wherein the central channel terminates in an opening in the distal end of the dispenser;

b) a hollow tip comprising a first opening that releasably couples with the distal end of the dispenser and a second opening at an opposite end of the tip; and c) a gantry for receiving the tip, wherein the gantry includes a mounting end coupled to and in alignment with a capture region of an open port interface (OPI).

2. The system of claim 1, wherein the distal end of the dispenser and the hollow tip are tapered and coupled such that the outer surface of the distal end of the dispenser is essentially flush with the inner surface of the hollow tip.

3. The system of claim 1, wherein the hollow tip is disposable or intended for single-use.

4. The system of claim 1, wherein the tip is made of a non-reactive material.

5. The system of claim 1, wherein the dispenser further comprises an ejection mechanism for removal of the hollow tip.

6. The system of claim 1, wherein the compressible portion of the gantry comprises a central channel extending therethrough and a spring mechanism.

7. The system of claim 1, wherein when the sampling system is assembled, the central channel and opening of the dispenser, the first and second openings of the hollow tip, and the central channel of the compressible portion of the gantry are centrally aligned.

8. The system of claim 1, wherein the hollow mounting end of the gantry releasably couples to an open port interface.

9. The system of claim 1, wherein the OPI is coupled to a mass spectrometer.

10. The system of claim 8, wherein the assembled sampling system aligns the hollow tip with an open end of the open port interface.

11. The system of claim 1, wherein the gantry is operative to restrict a depth of insertion of the tip.

12. A method for introducing a sample into an open port interface using a sampling system the method comprising:

a) mounting a hollow mounting end of the gantry on the open port interface;

b) inserting a dispenser supporting a sample into a receiver of the gantry;

c) compressing a compressible portion of the gantry with the dispenser to introduce the sample into a capture region of the open port interface.

13. The method of claim 12, wherein the sample is a liquid or solid material.

14. A sampling system comprising:

a) a gantry including:

i. a mounting end adapted to mount the gantry in alignment with a capture region of an open port interface (OPI), ii. a receiver for receiving a dispenser supporting a sample and aligning the dispenser with the capture region when the gantry is mounted to the OPI, and iii. a sample passage extending through the mounting end and the receiver to permit passage of the sample into the capture region when the dispenser is inserted into the receiver wherein the gantry comprises a receiver for accepting the hollow tip, a hollow mounting end oppositely disposed from the receiver, and a compressible portion disposed between the receiver and the hollow mounting end.

15. The sampling system of claim 14 further comprising the dispenser, wherein the dispenser includes a tapered end for engaging with the receiver.

16. The sampling system of claim 14, wherein the system further comprises a hollow tip for coupling to the dispenser and engaging with the receiver.

* * * * *